United States Patent
Uejima et al.

(10) Patent No.: US 7,901,320 B2
(45) Date of Patent: Mar. 8, 2011

(54) CONTROL DEVICE AND CONTROL METHOD FOR POWERTRAIN, PROGRAM FOR IMPLEMENTING THE CONTROL METHOD, AND RECORDING MEDIUM CONTAINING THE PROGRAM

(75) Inventors: Taiyo Uejima, Toyota (JP); Hiroatsu Endo, Nagoya (JP); Yoichi Tajima, Anjyo (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 729 days.

(21) Appl. No.: 11/987,784

(22) Filed: Dec. 4, 2007

(65) Prior Publication Data
US 2008/0153660 A1 Jun. 26, 2008

(30) Foreign Application Priority Data
Dec. 12, 2006 (JP) .................................. 2006-334381

(51) Int. Cl.
*B60W 10/04* (2006.01)
*B60W 10/10* (2006.01)
*B60W 10/18* (2006.01)

(52) U.S. Cl. ............................................ 477/4; 477/183

(58) Field of Classification Search .............. 477/4, 118, 477/183
See application file for complete search history.

(56) References Cited

U.S. PATENT DOCUMENTS

| 5,788,597 | A * | 8/1998 | Boll et al. .......................... 477/4 |
| 6,932,737 | B2 * | 8/2005 | Grassl et al. ....................... 477/4 |
| 7,131,708 | B2 * | 11/2006 | Tao et al. ........................ 303/152 |
| 7,572,204 | B2 * | 8/2009 | Doering et al. ............... 477/203 |
| 7,803,087 | B2 * | 9/2010 | Okubo et al. ..................... 477/4 |
| 2005/0090365 | A1 * | 4/2005 | Tamai et al. ...................... 477/5 |

FOREIGN PATENT DOCUMENTS

| JP | A 2000-229526 | 8/2000 |
| JP | A 2002-225578 | 8/2002 |
| JP | A 2003-293812 | 10/2003 |

* cited by examiner

Primary Examiner — Sherry Estremsky
(74) Attorney, Agent, or Firm — Oliff & Berridge, PLC

(57) ABSTRACT

A shock caused due to a change in the direction of torque transferred to an output shaft is reduced. There is provided a control device for a powertrain including a drive power source that transfers torque to an output shaft connected to a wheel of a vehicle, and a rotary electric machine that transfers torque to the output shaft via a transmission. When electric power generation performed using the rotary electric machine is restricted, if torque that decelerates the vehicle is transferred from the drive power source to the output shaft, a control is executed so that torque that does not decelerate the vehicle is transferred from the drive power source to the output shaft, and a shift control over the transmission is executed.

21 Claims, 8 Drawing Sheets

US 7,901,320 B2

CONTROL DEVICE AND CONTROL METHOD FOR POWERTRAIN, PROGRAM FOR IMPLEMENTING THE CONTROL METHOD, AND RECORDING MEDIUM CONTAINING THE PROGRAM

INCORPORATION BY REFERENCE

The disclosure of Japanese Paten Application No. 2006-334381 filed on Dec. 12, 2006 including the specification, drawings and abstract is incorporated herein by reference in its entirety.

BACKGROUND OF THE INVENTION

1. Field of Invention

The invention relates generally to a control device and control method for a powertrain, a program for implementing the control method, and a recording medium that contains the program, and, more specifically, to a technology for controlling a powertrain that includes a drive power source which transfers torque to an output shaft connected to wheels, and a rotary electric machine which transfers torque to the output shaft via a transmission.

2. Description of Related Art

Hybrid vehicles, in which an engine and a rotary electric machine, for example, a motor are used in combination as drive power sources, have been conventionally used. The torque output from the rotary electric machine is used to move the vehicle or to assist the engine. In some hybrid vehicles, the torque output from a rotary electric machine is transferred to wheels via a transmission that provides several sets of gears to produce the necessary gear ratios.

However, the transfer of torque from the rotary electric machine to the wheels via the transmission may be temporarily interrupted when the transmission is shifted to a selected gear. Therefore, a hybrid vehicle that is structured in a manner such that torque is continuously transferred to wheels has been suggested.

Japanese Patent Application Publication No. 2002-225578 (JP-A-2002-225578) describes a hybrid vehicle in which at least part of power transfer paths, through which powers from multiple drive power sources are transferred to wheels, is made common, and a power transfer state control device (transmission), which changes the state of power transfer between two rotational members, is provided in the power transfer path through which the power output from a specific drive power source (rotary electric machine) from among the multiple drive power sources is transferred to the wheels. The power transfer state control device is structured to change at least one of the rotational speed ratio between the two rotational members and the power transfer path between the two rotational members.

In the hybrid vehicle described in JP-A-2005-225578, even when the state of power transfer between the two rotational members is changed while the power from the specific drive power source is transferred to the wheels, the power from the drive power source other than the specific drive power source is transferred to the wheels. As a result, it is possible to suppress a decrease in the torque transferred to the wheels.

In a hybrid vehicle, a regenerative braking operation, in which a rotary electric machine is operated as a generator and electric energy is collected, is usually performed when the vehicle is decelerating. However, if the SOC (state of charge) of, for example, a battery is high, the generated electric power cannot be stored in the battery. Therefore, the electric power generation performed using the rotary electric machine, i.e., the regenerative braking operation, is restricted. When the electric power generation performed using the rotary electric machine is restricted, for example, a fuel-supply cutoff operation is performed in an engine in order to apply a sufficient amount of braking force to the vehicle. In a vehicle provided with a transmission between a rotary electric machine and an output shaft as in the hybrid vehicle described in JP-A-2005-225578, if gears are changed in the transmission and the rotational speed of an output shaft of the rotary electric machine is decreased in the above-described state, inertia torque of the rotary electric machine may be applied to the output shaft. At this time, a backlash in, for example, a differential gear unit provided between the transmission and wheels is reduced (the amount of a clearance between gears is reduced). As a result, the gears may contact each other, which causes a shock.

SUMMARY OF THE INVENTION

The invention provides a control device and method for a powertrain, which reduces a shock, a program for implementing the control method, and a recording medium that contains the program A first aspect of the invention relates to a control device for a powertrain including a drive power source that transfers torque to an output shaft connected to a wheel of a vehicle, and a rotary electric machine that transfers torque to the output shaft via a transmission. The control device includes: an electric power generation restriction unit that restricts electric power generation performed using the rotary electric machine; a control unit that controls the drive power source to transfer torque that does not decelerate the vehicle from the drive power source to the output shaft, if torque that decelerates the vehicle is transferred from the drive power source to the output shaft when the electric power generation performed using the rotary electric machine is restricted; and a shift control unit that controls the transmission to change gears when the torque that does not decelerate the vehicle is transferred from the drive power source to the output shaft.

A second aspect of the invention relates to a method for controlling a powertrain including a drive power source that transfers torque to an output shaft connected to a wheel of a vehicle, and a rotary electric machine that transfers torque to the output shaft via a transmission. According to the method, the drive power source is controlled to transfer torque that does not decelerate the vehicle from the drive power source to the output shaft, if torque that decelerates the vehicle is transferred from the drive power source to the output shaft when electric power generation performed using the rotary electric machine is restricted. Then, gears are changed when the torque that does not decelerate the vehicle is transferred from the drive power source to the output shaft According to the aspects of the invention described above, electric power generation using the rotary electric machine that transfers torque to the output shaft via the transmission is restricted. If the torque that decelerates the vehicle is transferred from the drive power source to the output shaft when the electric power generation using the rotary electric machine is restricted, the drive power source is controlled so that torque that does not decelerate the vehicle is transferred from the drive power source to the output shaft. Then, the transmission is controlled to change gears when the torque that does not decelerate the vehicle is transferred from the drive power source to the output shaft. In this manner, when the rotational speed of the rotary electric machine is reduced due to gear-change in the transmission and the inertia torque of the rotary electric machine is applied in such a direction that the vehicle is accelerated, namely, in such a direction that the vehicle is not decelerated, it is possible to prevent a change in the direction of the torque applied to the output shaft. Accordingly, it is possible to reduce a shock that may be caused when a backlash in, for example, a differential gear unit provided between the transmission and the wheel is reduced. Therefore, it is possible to provide the control device and method for a powertrain, which reduces a shock.

In the aspects of the invention described above, the vehicle may be provided with a brake system that applies a braking force to the vehicle. The braking force applied by the brake system may be increased, when the drive power source is controlled to transfer the torque that does not decelerate the vehicle from the drive power source to the output shaft.

The vehicle is provided with the brake system that applies a braking force to the vehicle. The braking force applied by the brake system is increased, when the drive power source is controlled to transfer the torque that does not decelerate the vehicle from the drive power source to the output shaft. Thus, it is possible to offer an excellent compromise between reducing a shock and decelerating the vehicle.

In the aspects of the invention described above, the drive power source may include at least one of an internal combustion engine and a rotary electric machine.

It is possible to reduce a shock in the power in which at least one of the internal combustion engine and the rotary electric machine is used as the drive power source.

In the aspects of the invention described above, the drive power source may include an internal combustion engine; and the internal combustion engine may be controlled to resume fuel injection in the internal combustion engine, thereby transferring the torque that does not decelerate the vehicle from the internal combustion engine to the output shaft, if the torque that decelerates the vehicle is transferred from the drive power source to the output shaft because the fuel injection in the internal combustion engine is cut off, when the electric power generation performed using the rotary electric machine is restricted.

The internal combustion engine is used as the drive power source. When the electric power generation performed using the rotary electric machine is restricted, if the torque that decelerates the vehicle is transferred from the drive power source to the output shaft because the fuel injection in the internal combustion engine is cut off, the internal combustion engine is controlled to resume fuel injection in the internal combustion engine, thereby transferring the torque that does not decelerate the vehicle from the internal combustion engine to the output shaft. Thus, it is possible to transfer the torque to the output shaft, using the internal combustion engine. Therefore, it is possible to reduce a shock that may be caused when a backlash in, for example, the differential gear unit provided between the transmission and the wheel is reduced.

A third aspect of the invention relates to a program according to which the method according to the second aspect of the invention is implemented by a computer.

A fourth aspect of the invention relates to a computer-readable recording medium that stores a program according to which the method according to the second aspect of the invention is implemented by a computer.

Thus, it is possible to implement the above-described method for controlling a power train, using a general-purpose computer or a dedicated-purpose computer.

BRIEF DESCRIPTION OF THE DRAWINGS

The foregoing and further objects, features and advantages of the invention will become apparent from the following description of an example embodiment with reference to the accompanying drawings, wherein the same or corresponding portions will be denoted by the same reference numerals and wherein.

DETAILED DESCRIPTION OF THE EMBODIMENT

Figure 1:
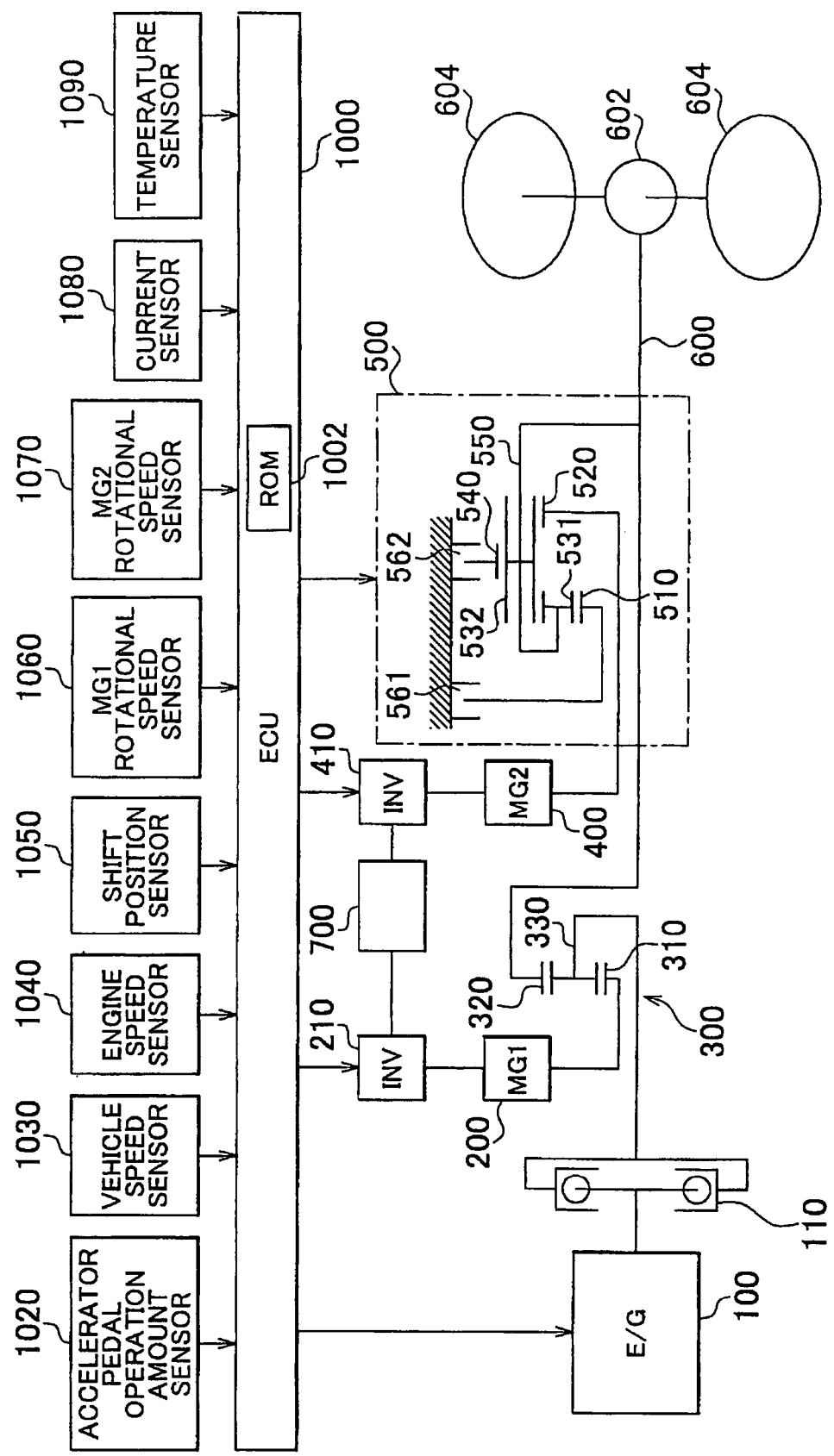
FIG. 1 is a diagram schematically showing the structure of a powertrain of a hybrid vehicle.

Hereafter, an embodiment of the invention will be described with reference to the accompanying drawings. The same reference numerals will be assigned to the same components. The names and functions of the components having the same reference numerals are also the same. Accordingly, the description concerning the components having the same reference numerals will be provided only once below.

A powertrain of a hybrid vehicle equipped with a control device according to an embodiment of the invention will be described with reference to FIG. 1. The control device according to the embodiment of the invention may be implemented when an ECU (Electronic Control Unit) 1000 executes a program stored in ROM (Read Only Memory) 1002 of the ECU 1000.

As shown in FIG. 1, the powertrain mainly includes an engine 100, a first motor generator (MG1) 200, a power split mechanism 300, a second motor generator (MG2) 400, and a transmission 500. The power split mechanism 300 may combine the torque from the engine 100 and the torque from the MG1 200 together and transfers the combined torque to the wheels. Alternatively, the power split mechanism 300 may split the torque from the engine 100 into the torque transferred to the MG1 200 and the torque transferred to the wheels.

The engine 100 is a known power unit, for example, a gasoline engine or a diesel engine, which produces power by burning fuel. The operating states of the engine 100, for example, the throttle valve opening amount (intake air amount), the fuel injection amount, and the ignition timing are electronically controlled. The operating states of the engine 100 are controlled by, for example, the ECU 1000 formed mainly of a microcomputer.

The MG1 200 is, for example, a three-phase alternating-current rotary electric machine, and has the function as a motor and the function as a generator. The MG1 200 is connected to an electric power storage device 700, for example, a battery via an inverter 210. The output torque or the regenerative torque of the MG1 200 is appropriately adjusted by controlling the inverter 210. The inverter 210 is controlled by the ECU 1000. A stator (not shown) of the MG1 200 is fixed so as not to rotate.

The power split mechanism 300 is a known gear mechanism that produces differential effects using three rotational elements, i.e., a sun gear (S) 310 that is an external gear, a ring gear (R) 320 that is an internal gear arranged concentrically with the sun gear (S) 310, and a carrier (C) 330 that supports pinions meshed with the sun gear (S) 310 and the ring gear (R) 320 in a manner such that the pinions are able to rotate on their axes and turn around the sun gear (S) 310. A crank shaft of the engine 100 is connected to the carrier (C) 330, which is the first rotational element, via a damper 110.

A rotor (not shown) of the MG1 200 is connected to the sun gear (S) 320 which is the second rotational element. Therefore, the sun gear (S) 310 serves as a reaction force element, while the ring gear (R) 320, which is the third rotational element, serves as a power output element. The ring gear (R) 320 is connected to an output shaft 600 of the transmission 500. The output shaft 600 of the transmission 500 is connected to wheels 604 via a differential gear unit 602.

Figure 2:
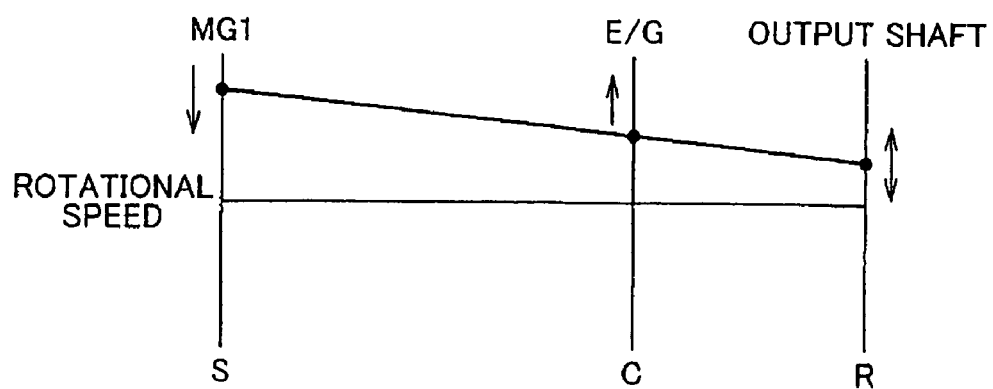
FIG. 2 is a collinear diagram for a power split mechanism.

FIG. 2 is a collinear diagram for the power split mechanism 300. As shown in FIG. 2, when the reaction torque from the MG1 200 is input in the sun gear (S) 310 while the torque output from the engine 100 is input in the carrier (C) 330, the torque, obtained by adding the reaction torque from the MG1 200 to the torque output from the engine 100 or by subtracting the reaction torque from the MG1 200 from the torque output from the engine 100, is output to the ring gear (R) 320, which serves as the power output element. In this case, the rotor of the MG1 200 is rotated by the torque output to the ring gear (R) 320, and the MG1 200 serves as a generator. If the rotational speed (output rotational speed) of the ring gear (R) 320 is constant, the engine speed of the engine 100 may be continuously (steplessly) varied by increasing and decreasing the rotational speed of the MG1 200. In other words, the control for setting the engine speed of the engine 100 to an engine speed, at which the best fuel efficiency is achieved, may be executed by controlling the MG1 200. This control is executed by the ECU 1000.

When the engine 100 is stopped while the vehicle is in motion, the MG 200 rotates in the reverse direction. Then, when the MG1 200 is used as a motor to output torque in the forward rotational direction, a torque that rotates the engine 100 in the forward direction is applied to the engine 100 connected to the carrier (C) 330. Thus, the engine 100 is started by the MG1 200 (motoring or cranking is performed). In this case, a torque that stops the rotation of the output shaft 600 is applied to the output shaft 600. Accordingly, drive torque that moves the vehicle is maintained by controlling the torque output from the MG2 400 and, at the same time, the engine 100 is started smoothly. The hybrid vehicle described above is called a mechanical distribution type hybrid vehicle or a split type hybrid vehicle.

As shown in FIG. 1, the MG2 400 is, for example, a three-phase alternating-current rotary electric machine, and has the function as a motor and the function as a generator. The MG2 400 is connected to the electric power storage device 700, for example, a battery via an inverter 410. The power running operation, the regenerative operation, and the torque in each of the power running operation and the regenerative are controlled by controlling the inverter 410. A stator (not shown) of the MG2 400 is fixed so as not to rotate.

The transmission 500 is formed of a Ravigneaux-type planetary gear mechanism. The transmission 500 includes a first sun gear (S1) 510 and a second sun gear (S2) 520 each of which is an external gear. First pinions 531 are meshed with the first sun gear (S1) 510, and the first pinions 531 are also meshed with second pinions 532. The second pinions 532 are meshed with a ring gear (R) 540 arranged concentrically with each of the sun gears 510 and 520.

A carrier (C) 550 supports each the first pinions 531 and the second pinions 532 in a manner such that the first pinions 531 and the second pinions 532 are able to rotate on their axes, the first pinions 531 are able to turn around the first sun gear (S1) 510, and the second pinions 532 are able to turn around the first sun gear (S1) 510 and the second sun gear (S2) 520. The second sun gear (S2) 520 is meshed with the second pinions 532. Therefore, the first sun gear (S1) 510, the ring gear (R) 540, the first pinions 531 and the second pinions 532 form a double-pinion-type planetary gear mechanism. The second sun gear (S2) 520, the ring gear (R) 540, and the second pinions 532 form a single-pinion-type planetary gear mechanism.

The transmission 500 further includes a brake (B1) 561 that selectively fixes the first sun gear (S1) 510, and a brake (B2) 562 that selectively fixes the ring gear (R) 540. The brakes 561 and 562 are so-called friction devices that generate engagement force using friction force. A multiple-disc engagement device or a band-type engagement device may be employed as each of the brake (B1) 561 and the brake (B2) 562. Each of the brakes 561 and 562 is configured in a manner such that the torque capacity thereof is continuously varied in accordance with the engagement force generated by a hydraulic pressure. The MG2 400 is connected to the second sun gear (S2) 520. The carrier (C) 550 is connected to the output shaft 600.

Therefore, in the transmission 500, the second sun gear (S2) 520 serves as a power input element, and the carrier (C) 550 serve as a power output element. A high gear with a gear ratio higher than "1" is selected by engaging the brake (B11) 561. A low gear with a gear ratio higher than the gear ratio at the high gear is selected by engaging the brake (B2) 562 instead of the brake (B1) 561.

The gears are changed based on the running state of the vehicle such as the vehicle speed, and the required drive power (or the accelerator pedal operation amount). More specifically, gear ranges are defined in advance in a map (shift diagram), and the transmission 500 is controlled in a manner such that one of the gears is selected based on the detected operating state.

Figure 3:
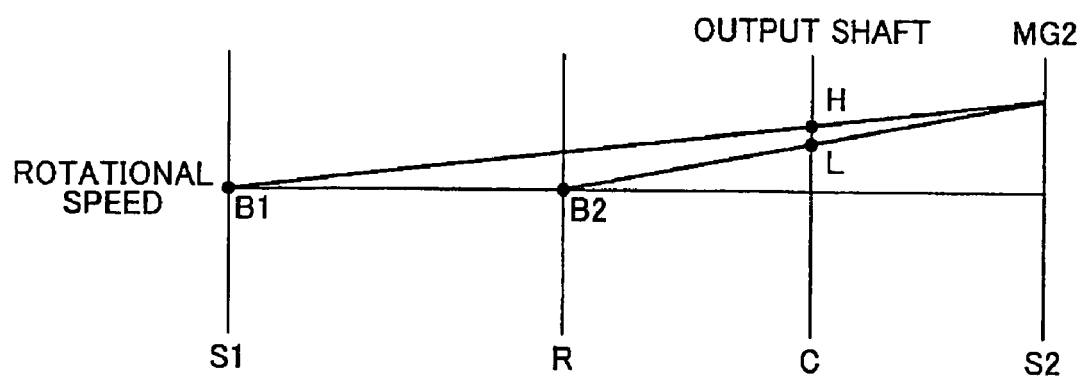
FIG. 3 is a collinear diagram for a transmission.

FIG. 3 is a collinear diagram for the transmission 500. As shown in FIG. 3, when the ring gear (R) 540 is fixed by the brake (B2) 562, the low gear L is selected. Then, the torque output from the MG2 400 is amplified in accordance with the gear ratio, and the amplified torque is applied to the output shaft 600. In contrast, when the first sun gear (S1) 510 is fixed by the brake (B1) 561, the high gear H with a gear ratio lower than than the gear ratio at the low gear L is selected. Because the gear ratio at the high gear H is also higher than "1", the torque output from the MG2 400 is amplified in accordance with the gear ratio and the amplified torque is applied to the output shaft 600.

When the low gear L or the high gear H is maintained, the torque, obtained by amplifying the torque output from the MG2 400 in accordance with the gear ratio, is applied to the output shaft 600. In contrast, when the gears are being changed, the torque, influenced by the torque capacity of each of the brakes 561 and 562 or by inertia torque in accordance with a change in the rotational speed, is applied to the output shaft 600. The torque applied to the output shaft 600 is a positive torque when the MG2 400 is in the drive state, whereas the torque applied to the output shaft 600 is a negative torque when the MG2 400 is in the driven state.

Figure 4:
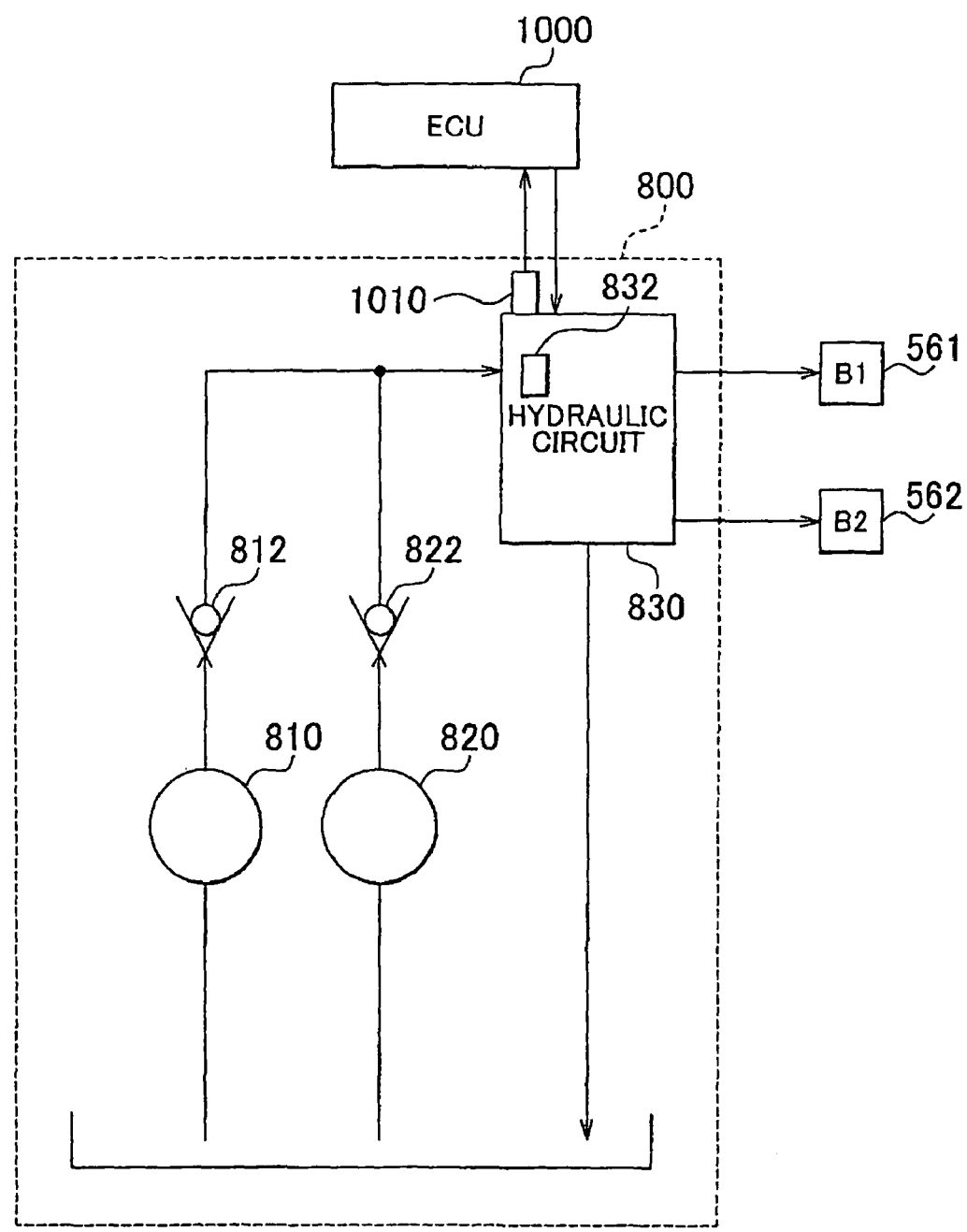
FIG. 4 is a diagram showing a hydraulic control device for the hybrid vehicle.

As shown in FIG. 4, the hybrid vehicle is provided with a hydraulic pressure control device 800 that controls the engagement/release states of the brakes 561 and 562 by applying a hydraulic pressure to the brakes 561 and 562 or by releasing a hydraulic pressure from the brakes 561 and 562.

The hydraulic pressure control device 800 includes a mechanical oil pump 810, an electric oil pump 820, and a hydraulic circuit 830. The hydraulic circuit 830 regulates the hydraulic pressure generated by the oil pumps 810 and 820 to a line pressure, applies/releases the hydraulic pressure, obtained through regulation performed using the line pressure as the original pressure, to/from the brakes 561 and 562, and supplies the lubrication oil to a portion that requires lubrication.

The mechanical oil pump 810 is a pump that is driven by the engine 100 to generate a hydraulic pressure. For example, the mechanical oil pump 810 is coaxially arranged on the output side of the damper 110, and operates using the torque supplied from the engine 100. The electric oil pump 820 is a pump driven by a motor (not shown). The electric oil pump 820 is attached to an appropriate portion, for example, an outside portion of a casing (not shown), and operates using the electric power supplied from the power storage device, for example, a battery to generate a hydraulic pressure. The electric oil pump 820 is controlled by the ECU 1000 to generate a desired hydraulic pressure. For example, the rotational speed of the electric oil pump 820 is controlled in a feedback manner.

The hydraulic circuit 830 includes a plurality of solenoid valves, and change-over valves or pressure regulator valves (all being not shown), and is configured in a manner such that pressure regulation and application/release of the hydraulic pressure to/from the brakes 561 and 562 are electrically controlled. This control is executed by the ECU 1000. The temperature of a hydraulic fluid (hereinafter, sometimes referred to as the "oil temperature") that flows within the hydraulic circuit is detected by an oil temperature sensor 1010, and a signal that indicates the detected oil temperature is transmitted to the ECU 1000.

A check valve 812 and a check valve 822 are provided on the discharge sides of the oil pump 810 and the oil pump 820, respectively. The check valves 812 and 822 are opened by the discharge pressures produced when the oil pumps 810 and 820 discharge the hydraulic fluid, respectively. The check valves 812 and 822 are closed by the pressures applied in the direction opposite to the direction in which the discharge pressures are applied. The oil pumps 810 and 820 are connected to the hydraulic circuit 830, and arranged in parallel with each other.

A solenoid valve 832 regulates the line pressure. The solenoid valve 832 adjusts the line pressure to a line pressure in the high-pressure state or a line pressure in the low-pressure state. In the high-pressure state, the amount of hydraulic fluid discharged from the solenoid valve 832 is increased to increase the line pressure to the first hydraulic pressure P1. In the low-pressure state, the amount of hydraulic fluid discharged from the solenoid valve 832 is decreased to decrease the line pressure to the second hydraulic pressure P2.

Because the powertrain described above includes two drive power sources, i.e., the engine 100 and the MG2 400, the vehicle is operated in the operation mode, in which the fuel efficiency is high and a small amount of exhaust gas is discharged, by effectively using these drive power sources. Even when the engine 100 is driven, the engine speed is controlled by the MG1 200 so that the optimal fuel efficiency is achieved. When the vehicle coasts, inertia energy of the vehicle is regenerated as electric power. When the MG2 400 is driven to produce an assist torque, if the vehicle speed is low, the transmission 500 is shifted to the low gear L to increase the torque applied to the output shaft 600. On the other hand, if the vehicle speed is has been increased, the transmission 500 is shifted to the high gear H to relatively decrease the rotational speed of the MG2 400 and reduce the loss. As a result, the assist torque is produced efficiently.

The hybrid vehicle described above is able to run in any one of the running mode in which only the engine 100 is used as the drive power source, the running mode in which the engine 100 and the MG2 400 are used in combination as the drive power sources, and the running mode in which only the MG2 400 is used as the drive power source. The running mode that will be implemented is selected based on the required amount of drive power indicated by, for example, the accelerator pedal operation amount, the vehicle speed, the engine speed, the position (shift position) of a shift lever (not shown), etc.

As shown in FIG. 1, the accelerator pedal operation amount is detected by an accelerator pedal operation amount sensor 1020, the vehicle speed is detected by a vehicle speed sensor 1030, the engine speed is detected by an engine speed sensor 1040, and the shift position is detected by a shift position sensor 1050.

The rotational speed of the MG1 200 is detected by a MG1 rotational speed sensor 1060. The rotational speed of the MG2 400 is detected by a MG2 rotational speed sensor 1070. The value of electric current supplied to or discharged from the electric power storage device 700 is detected by a current sensor 1080. The temperature of the electric power storage device 700 is detected by a temperature sensor 1090.

Figure 5:
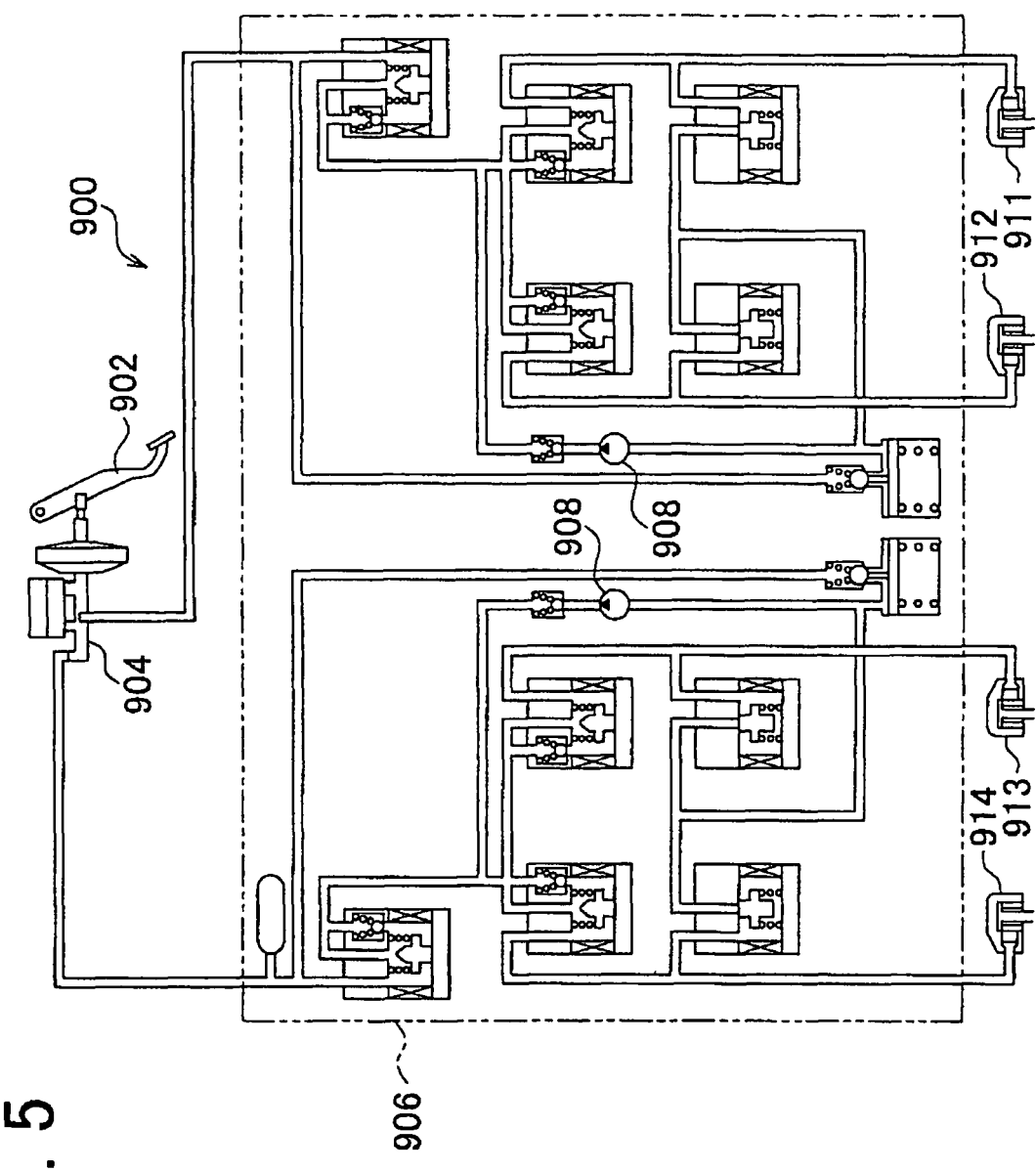
FIG. 5 is a diagram showing a brake system of the hybrid vehicle.

Hereafter, a brake system 900 that applies a braking force to the hybrid vehicle will be described with reference to FIG. 5. A brake pedal 902 is connected to a master cylinder 904. When the brake pedal 902 is operated, a hydraulic pressure in accordance with the brake operational amount is produced in the master cylinder 904.

The hydraulic pressure produced in the master cylinder 904 is supplied to calipers 911 to 914 provided to the respective wheels via a brake actuator 906 controlled by the ECU 1000. That is, when the brake pedal 902 is operated, the brake actuator 906 is controlled so that the hydraulic pressure produced in the master cylinder 904 is supplied to the calipers 911 to 914. A braking force is applied to the vehicle by supplying the hydraulic pressure to the calipers 911 to 914.

Each of the calipers 911 to 914 is supplied with the hydraulic pressure produced in the brake actuator 906 in addition to the hydraulic pressure in accordance with the operational amount of the brake pedal 902. The brake actuator 906 includes solenoid valves and pumps 908.

By controlling the open/close states of the solenoid valves, the hydraulic pressures produced by the pumps 908 are supplied to the calipers 911 to 914, or the hydraulic pressures are released from the calipers 911 to 914. In this way, the brake pressures, i.e., the braking forces applied to the respective wheels are controlled. The operation amount of each of the calipers 911 to 914 corresponds to the hydraulic pressure. Note that, electrically-operated calipers may be provided instead of the hydraulically-operated calipers.

Figure 6:
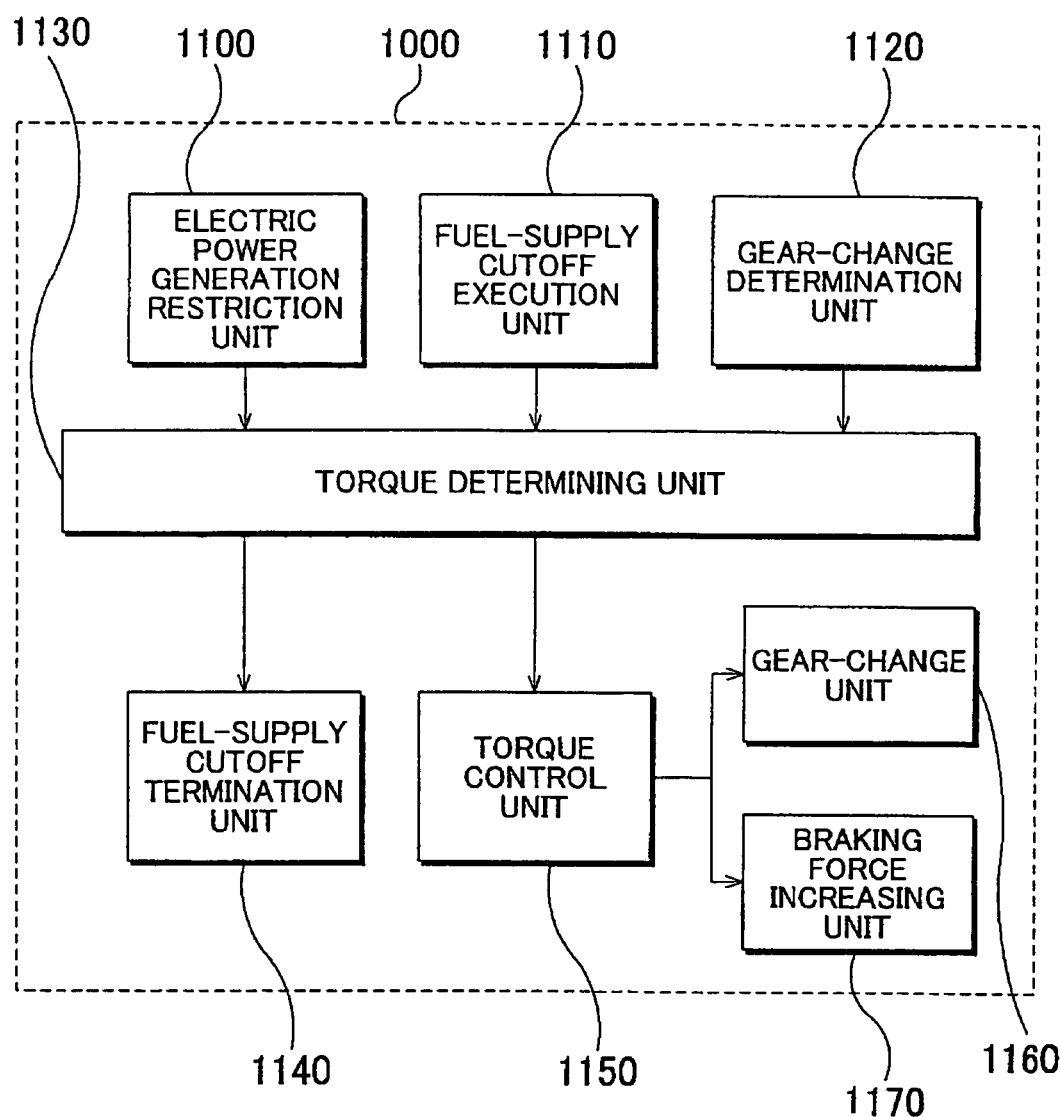
FIG. 6 is a function block diagram of an electronic control unit (ECU)

Hereafter, functions of the ECU 1000, which is the control device according to the embodiment of the invention, will be described with reference to FIG. 6. The functions described below may be implemented by either hardware or software.

The ECU 1000 includes an electric power generation restriction unit 1100, a fuel-supply cutoff execution unit 1110, a gear-change determination unit 1120, a torque determination unit 1130, a fuel-supply cutoff termination unit 1140, a torque control unit 1150, a gear-change unit 1160, and a braking force increasing unit 1170.

The electric power generation restriction unit 1100 restricts the regenerative braking operation performed using the MG2 400, for example, when the SOC (state of charge) of the electric power storage device 700, which is calculated based on the value of electric current supplied to or discharged from the electric power storage device 700, is above the threshold value A, when the temperature of the electric power storage device 700 is above the threshold value B, or when the temperature of the electric power storage device 700 is below the threshold value C. That is, the electric power generation performed using the MG2 400 is restricted (not performed).

The fuel-supply cutoff execution unit 1110 performs the fuel-supply cutoff operation for stopping the fuel injection in the engine 100, when the regenerative braking operation performed using the MG2 400 is restricted. The gear-change determination unit 1120 determines whether gears should be changed in the transmission 500.

The torque determination unit 1130 determines whether the torque transferred from the engine 100 and the MG1 200 to the output shaft 600 is the torque that decelerates the vehicle, when the regenerative braking operation performed using the MG2 400 is restricted and the fuel-supply cutoff operation is performed. In other words, when the torque that accelerates the vehicle is indicated by a positive value whereas the torque that decelerates the vehicle is indicated by a negative value, the torque determination unit 1130 determines whether the torque transferred from the engine 100 and the MG1 200 to the output shaft 600 is a negative value or a value equal to or higher than zero.

The torque transferred from the engine 100 and the MG1 200 to the output shaft 600 is calculated based on a map that uses, for example, the engine speed and the rotational speed of the MG1 200 as parameters. Because the torque transferred from the engine 100 and the MG1 200 to the output shaft 600 may be calculated according to a known technology, the description concerning the calculation method is provided in this specification.

The fuel-supply cutoff termination unit 1140 controls the engine 1000 to terminate the fuel-supply cutoff operation, when it is determined that the transmission 500 should be shifted to a higher gear and the torque transferred from the engine 100 and the MG1 200 to the output shaft 600 is a negative value.

The torque control unit 1150 executes the cooperation control over the engine 100 and the MG1 200 so that the torque transferred from the engine 100 and the MG1 200 to the output shaft 600 is equal to or higher than zero, i.e., so that that torque that does not decelerate the vehicle is transferred from the engine 100 and the MG1 200 to the output shaft 600. The torque transferred from the engine 100 and the MG1 200 to the output shaft 600 is gradually increased until it becomes equal to or higher than zero (the torque that decelerates the vehicle is gradually decreased).

The torque transferred to the output shaft 600 may be increased to a value equal to or higher than zero by using only the engine 100. Alternatively, the torque transferred to the output shaft 600 may be increased to a value equal to or higher than zero by using only the MG1 200.

The gear-change unit 1160 executes a control to shift the transmission 500 to a higher gear, when the engine 100 and the MG1 200 are controlled so that the torque transferred from the engine 100 and the MG1 200 to the output shaft 600 is equal to or higher than zero.

The braking force increasing unit 1170 controls the brake actuator 906 to increase the braking force applied by the brake system 900, when the engine 100 and the MG1 200 are controlled so that the torque transferred from the engine 100 and the MG1 200 to the output shaft 600 is equal to or higher than zero.

Figure 7:
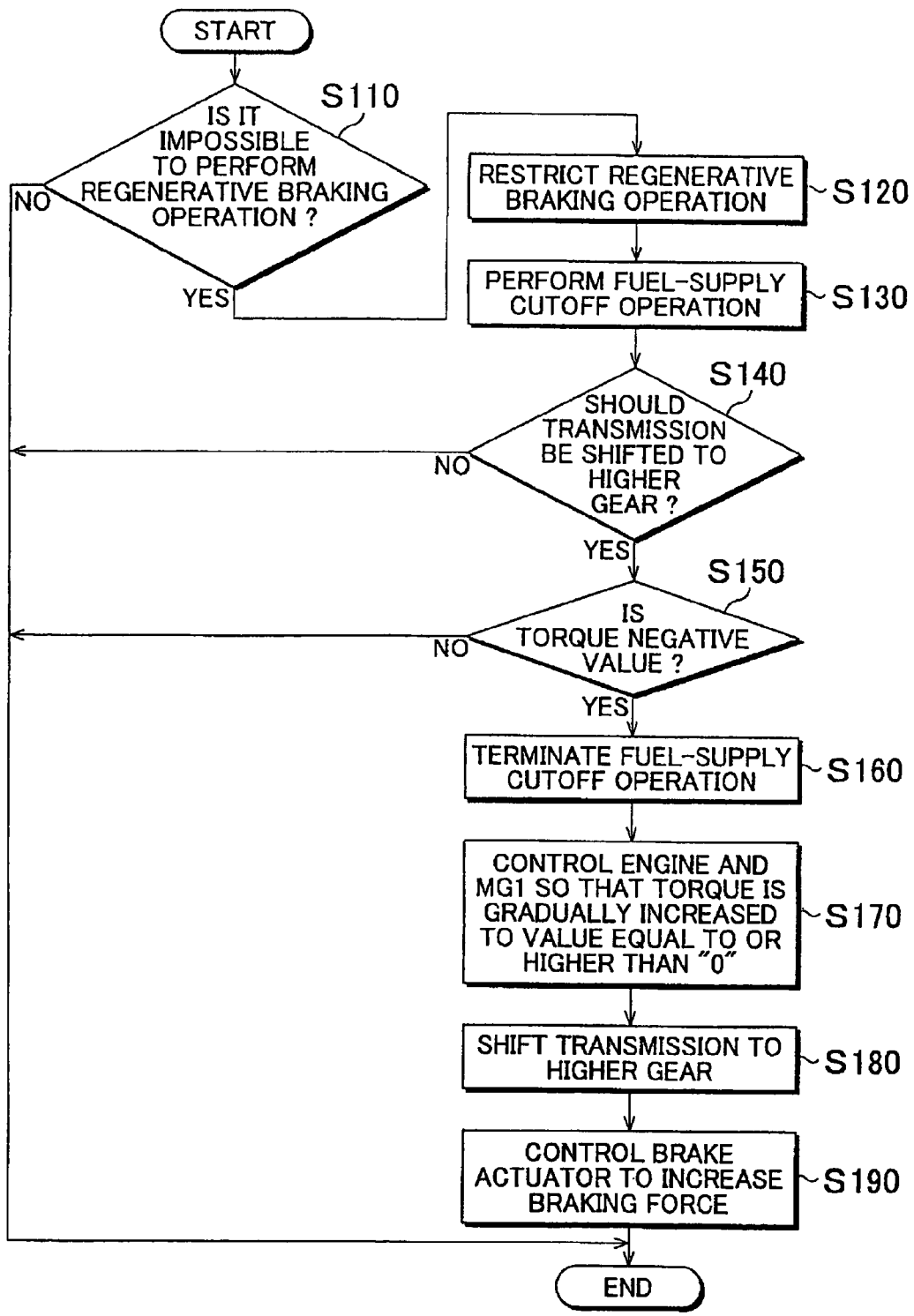
FIG. 7 is a flowchart showing the routine executed by the ECU.

Hereafter, the routine executed by the ECU 1000, which is the control device according to the embodiment of the invention, will be described with reference to FIG. 7. The routine is executed at predetermined intervals.

In step S110, the ECU 1000 determines whether it is impossible to perform the regenerative braking operation using the MG2 400. For example, the ECU 1000 determines that it is impossible to perform the regenerative braking operation using the MG2 400, when the SOC of the electric power storage device 700 is above the threshold value A, when the temperature of the electric power storage device 700 is above the threshold value B, or when the temperature of the electric power storage device 700 is below the threshold value C.

When the ECU 1000 determines that it is impossible to perform the regenerative braking operation using the MG2 400 (YES in step S110), the ECU 1000 executes step S120. On the other hand, when the ECU 1000 determines that it is not impossible to perform the regenerative braking operation using the MG2 400 (NO in step S110), the routine ends. In step S120, the ECU 1000 restricts the regenerative braking operation using the MG2 400. In step S130, the ECU 1000 performs the fuel-supply cutoff operation for stopping the fuel injection in the engine 100.

In step S140, the ECU 1000 determines whether the transmission 500 should be shifted to a higher gear. If it is determined that the transmission 500 should be shifted to a higher gear (YES in step S140), the ECU 1000 executes step S150. On the other hand, if it is determined that the transmission 500 need not be shifted to a higher gear (NO in step S140), the routine ends.

In step S150, the ECU 1000 determines whether the torque transferred from the engine 100 and the MG1 200 to the output shaft 600 decelerates the vehicle, i.e., whether the torque transferred to the output shaft 600 is a negative value. If it is determined that the torque transferred from the engine 100 and the MG1 200 to the output shaft 600 is a negative value (YES in step S150), the ECU 1000 executes step S160. On the other hand, if it is determined that the torque transferred to the output shaft 600 is not a negative value (NO in step S150), the routine ends.

In step S160, the ECU 1000 controls the engine 100 to terminate the fuel-supply cutoff operation. In step S170, the ECU 1000 controls the engine 100 and the MG1 200 so that the torque transferred from the engine 100 and the MG1 200 to the output shaft 600 gradually increases to a value equal to or higher than zero, i.e., so that the torque that does not decelerate the vehicle is transferred from the engine 100 and the MG1 200 to the output shaft 600.

In step S1180, the ECU 1000 executes a control to shift the transmission 500 to a higher gear. In step S190, the ECU 1000 controls the brake actuator 906 to increase the braking force applied by the brake system 900.

Hereafter, the operation of the ECU 1000, which is the control device according to the embodiment of the invention, will be described with reference to the above-described structure and flowchart. The following description will be provided on the assumption that, the vehicle is accelerated and the transmission 500 is shifted from the low gear L to the high gear H while the vehicle is running on a downhill slope, although the accelerator pedal operation amount is small, i.e., the drive power is a negative value.

If it is determined that it is impossible to perform the regenerative braking operation using the MG2 400 (YES in step S10), the regenerative braking operating using the MG2 400 is restricted (step S120).

In this case, the fuel-supply cutoff operation for stopping the fuel injection in the engine 100 is perform to apply a sufficient braking force to the vehicle (step S130). Accordingly, the torque that decelerates the vehicle is transferred to the output shaft 600 by using the engine 100 as a load. As a result, a braking force is applied to the vehicle by using the engine 100.

Figure 8:
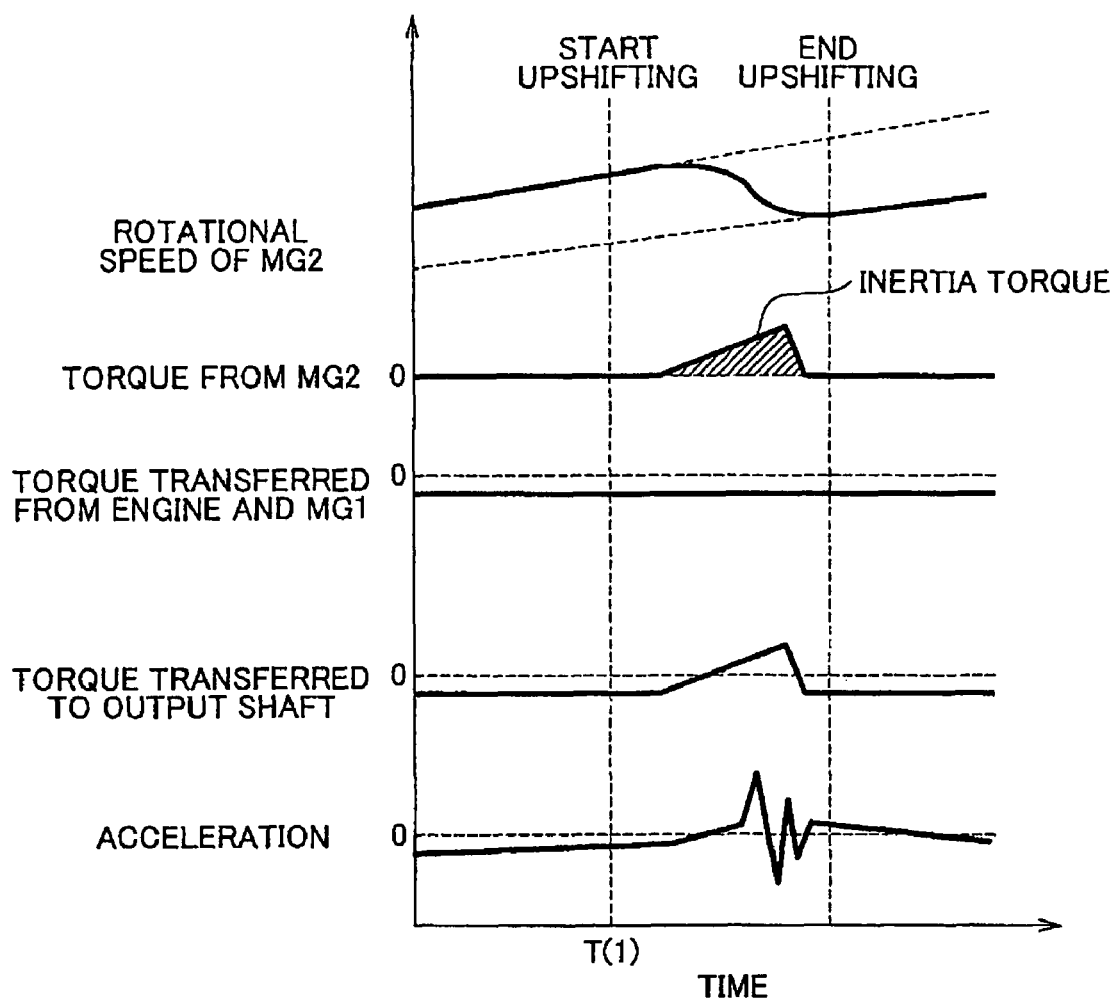
FIG. 8 is a first timing chart showing time-changes in the rotational speed of a motor generator MG2, the torque output from the motor generator MG2, and the acceleration of the vehicle.

At this time, the torque transferred from the engine 100 and the MG1 200 to the output shaft 600 may be a negative value. In that state, if shifting of the transmission 500 to a higher gear is started at time T1 in FIG. 8 and the rotational speed of the MG2 400 decreases, the inertia torque of the MG2 400, which accelerates the vehicle, may be transferred to the output shaft 600.

At this time, the torque transferred to the output shaft 600 changes from a negative value to a positive value. When the torque transferred to the output shaft 600 is changed from a negative value to a positive value, a backlash in, for example, the differential gear unit 602 provided between the transmission 500 and the wheels 604 is abruptly reduced, which may cause a shock.

Figure 9:
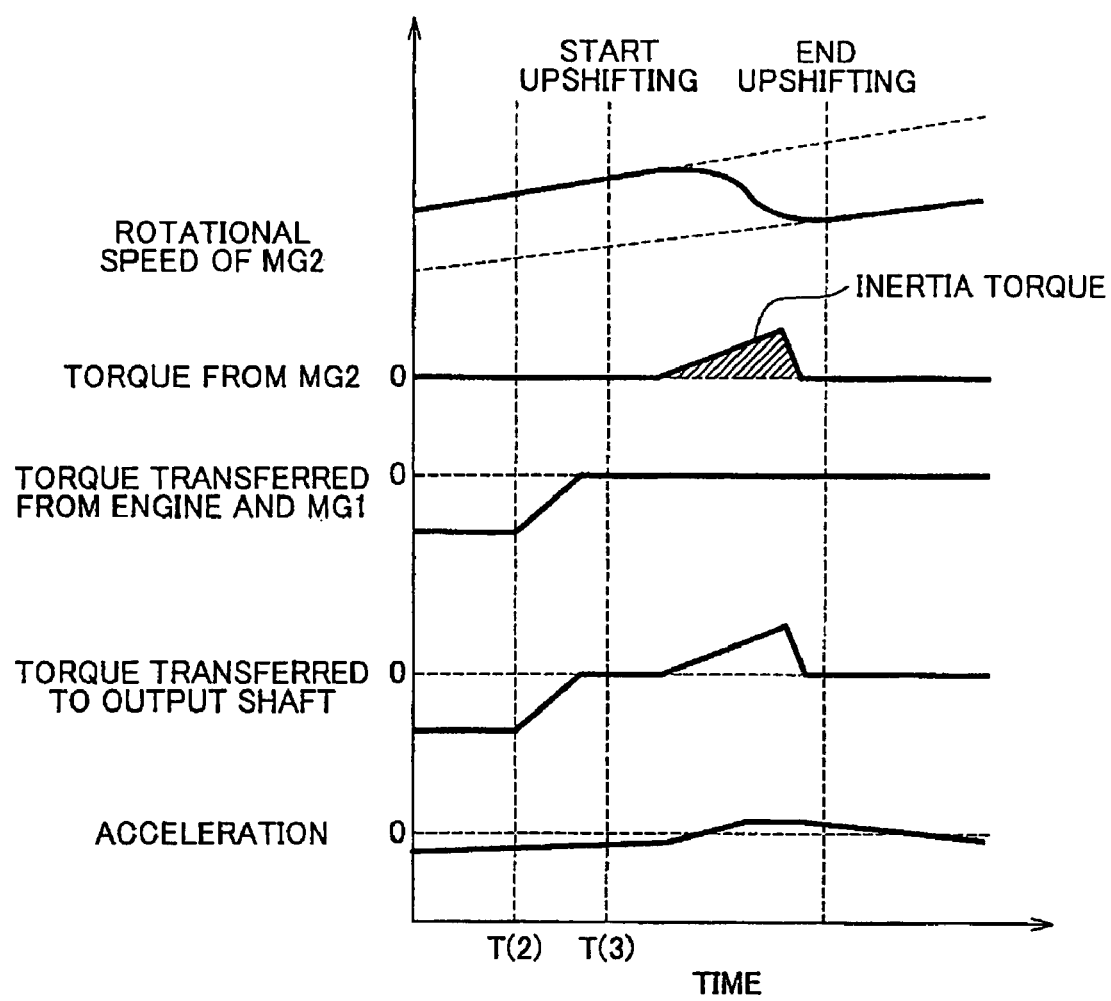
FIG. 9 is a second timing chart showing time-changes in the rotational speed of the motor generator MG2, the torque output from the motor generator MG2, and the acceleration of the vehicle.

Therefore, if it is determined that the transmission 500 should be shifted to a higher gear (YES in step S140) and that the torque transferred from the engine 100 and the MG1 200 to the output shaft 600 is a negative value (YES in step S150), the engine 100 is controlled such that the fuel-supply cutoff operation is terminated at time T2 in FIG. 9. Next, the engine 100 and the MG1 200 are controlled so that the torque transferred from the engine 100 and the MG1 200 to the output shaft 600 is gradually increased to a value equal to or higher than zero (step S170).

In that state, a control is executed so that shifting of the transmission 500 to a higher gear is started at time T3 (S180). In this way, the torque, which is transferred to the output shaft 600 during the shifting of the transmission 500 to a higher gear, does not change from a negative value to a positive value. As a result, a shock that may be caused during shifting of the transmission 500 to a higher gear is reduced.

Meanwhile, if the engine 100 and the MG1 200 are controlled so that the torque transferred from the engine 100 and the MG1 200 to the output shaft 600 is gradually increased to a value equal to or higher than zero, the braking force applied to the vehicle by the engine 100 may be insufficient. Therefore, the brake actuator 906 is controlled to increase the braking force applied by the brake system 900 (step S190). As a result, a sufficient braking force is applied to the vehicle.

In the embodiment of the invention, step S180 is executed before step S190. Alternatively, step S190 may be executed before step S180.

As described above, with the ECU 1000, which serves as the control device according to the embodiment of the invention, the fuel-supply cutoff operation performed in the engine 100 is terminated, if it is determined that the transmission 500 provided between the MG2 and the output shaft 600 should be shifted to a higher gear and the torque transferred to the output shaft 600 from the engine 100 and the MG1 is a negative value, when the regenerative braking operation performed using the MG2 is restricted. Then, the engine 100 and the MG1 are controlled so that the torque transferred from the engine 100 and the MG1 200 to the output shaft 600 is gradually increased to a value equal to or higher than zero.

The control is executed such that the transmission 500 is shifted to a higher gear when the torque transferred from the engine 100 and the MG1 200 to the output shaft 600 is equal to or higher than zero. In this way, the torque transferred to the output shaft 600 during shifting of the transmission 500 to a higher gear does not change from a negative value to a positive value. That is, the direction of the torque transferred to the output shaft 600 is not changed. As a result, it is possible to reduce a shock that may be caused when a backlash in, for example, the differential gear unit provided between the transmission 500 and the wheel is reduced.

The vehicles to which the invention is applied are not limited to hybrid vehicles that include the engine 100 and the MG1 which transfer torque to the output shaft 600 via the power split mechanism 300, and the MG2 which transfers torque to the output shaft 600 via the transmission 500. The invention may also be applied to any vehicles which include a motor that transfers torque to an output shaft via a transmission which provides various gear ratios and a drive power source different from this motor, and in which a shock that may be caused due to reduction in a backlash in, for example, a differential gear unit should be reduced.

While the invention has been described with reference to an example embodiment thereof it is to be understood that the invention is not limited to the example embodiment. To the contrary, the invention is intended to cover various modifications and equivalent arrangements within the scope of the invention.

What is claimed is:

1. A control device for a powertrain including a drive power source that transfers torque to an output shaft connected to a wheel of a vehicle and a rotary electric machine that transfers torque to the output shaft via a transmission, the control device comprising:

an electric power generation restriction unit that restricts electric power generation performed using the rotary electric machine;

a control unit that controls the drive power source to transfer torque that does not decelerate the vehicle from the drive power source to the output shaft, if torque that decelerates the vehicle is transferred from the drive power source to the output shaft when the electric power generation performed using the rotary electric machine is restricted; and a shift control unit that controls the transmission to change gears when the torque that does not decelerate the vehicle is transferred from the drive power source to the output shaft.

2. The control device according to claim 1, wherein:

the vehicle is provided with a brake system that applies a braking force to the vehicle; and the control device further includes a brake system unit that executes a control to increase the braking force applied by the brake system, when the drive power source is controlled to transfer the torque that does not decelerate the vehicle from the drive power source to the output shaft.

3. The control device according to claim 2, wherein the drive power source includes at least one of an internal combustion engine and a rotary electric machine.

4. The control device according to claim 2, wherein:

the drive power source includes an internal combustion engine; and the control unit includes an engine control unit that controls the internal combustion engine to resume fuel injection in the internal combustion engine, thereby transferring the torque that does not decelerate the vehicle from the internal combustion engine to the output shaft, if the torque that decelerates the vehicle is transferred from the drive power source to the output shaft because the fuel injection in the internal combustion engine is cut off, when the electric power generation performed using the rotary electric machine is restricted.

5. The control device according to claim 2, further comprising:
an upshifting determination unit that determines whether the transmission should be shifted to a higher gear,
a torque transfer determination unit that determines whether the torque that decelerates the vehicle is transferred from the drive power source to the output shaft, when the upshifting determination unit determines that the transmission should be shifted to a higher gear, and
a torque control unit that executes a control to transfer the torque that does not decelerate the vehicle from the drive power source to the output shaft, when the torque that decelerates the vehicle is transferred from the drive power source to the output shaft.

6. The control device according to claim 5, further comprising:
an upshifting unit that shifts the transmission to a higher gear, when transfer of the torque, which does not decelerate the vehicle, from the drive power source to the output shaft is started.

7. The control device according to claim 1, wherein the drive power source includes at least one of an internal combustion engine and a rotary electric machine.

8. The control device according to claim 1,
wherein:
the drive power source includes an internal combustion engine; and
the control unit includes an engine control unit that controls the internal combustion engine to resume fuel injection in the internal combustion engine, thereby transferring the torque that does not decelerate the vehicle from the internal combustion engine to the output shaft, if the torque that decelerates the vehicle is transferred from the drive power source to the output shaft because the fuel injection in the internal combustion engine is cut off, when the electric power generation performed using the rotary electric machine is restricted. when the electric power generation performed using the rotary electric machine is restricted.

9. The control device according to claim 1, further comprising:
an upshifting determination unit that determines whether the transmission should be shifted to a higher gear;
a torque transfer determination unit that determines whether the torque that decelerates the vehicle is transferred from the drive power source to the output shaft, when the upshifting determination unit determines that the transmission should be shifted to a higher gear; and
a torque control unit that executes a control to transfer the torque that does not decelerate the vehicle from the drive power source to the output shaft, when the torque that decelerates the vehicle is transferred from the drive power source to the output shaft.

10. The control device according to claim 9, further comprising:
an upshifting unit that shifts the transmission to a higher gear, when transfer of the torque, which does not decelerate the vehicle, from the drive power source to the output shaft is started.

11. A method for controlling a powertrain including a drive power source that transfers torque to an output shaft connected to a wheel of a vehicle and a rotary electric machine that transfers torque to the output shaft via a transmission, the method comprising:
controlling the drive power source to transfer torque that does not decelerate the vehicle from the drive power source to the output shaft, if torque that decelerates the vehicle is transferred from the drive power source to the output shaft when electric power generation performed using the rotary electric machine is restricted; and
changing gears when the torque that does not decelerate the vehicle is transferred from the drive power source to the output shaft.

12. The method according to claim 11,
wherein:
the vehicle is provided with a brake system that applies a braking force to the vehicle; and
the method further comprises:
increasing the braking force applied by the brake system, when the drive power source is controlled to transfer the torque that does not decelerate the vehicle from the drive power source to the output shaft.

13. The control method according to claim 12, wherein the drive power source includes at least one of an internal combustion engine and a rotary electric machine.

14. The method according to claim 12,
wherein:
the drive power source includes an internal combustion engine; and
fuel injection in the internal combustion engine is resumed to transfer the torque that does not decelerate the vehicle from the internal combustion engine to the output shaft, if the torque that decelerates the vehicle is transferred from the drive power source to the output shaft because the fuel injection in the internal combustion engine is cut off, when the electric power generation performed using the rotary electric machine is restricted.

15. A program according to which the method according to claim 12 is implemented by a computer.

16. A computer-readable recording medium that stores a program according to which the method according to claim 12 is implemented by a computer.

17. The control method according to claim 11, wherein the drive power source includes at least one of an internal combustion engine and a rotary electric machine.

18. The control method according to claim 11,
wherein:
the drive power source includes an internal combustion engine; and
fuel injection in the internal combustion engine is resumed to transfer the torque that does not decelerate the vehicle from the internal combustion engine to the output shaft, if the torque that decelerates the vehicle is transferred from the drive power source to the output shaft because the fuel injection in the internal combustion engine is cut off, when the electric power generation performed using the rotary electric machine is restricted.

19. A program according to which the method according to claim 11 is implemented by a computer.

20. A computer-readable recording medium that stores a program according to which the method according to claim 11 is implemented by a computer.

21. A control device for a powertrain including a drive power source that transfers torque to an output shaft connected to a wheel of a vehicle and a rotary electric machine that transfers torque to the output shaft via a transmission, the control device comprising:
    electric power generation restriction means for restricting electric power generation performed using the rotary electric machine;
    control means for controlling the drive power source to transfer torque that does not decelerate the vehicle from the drive power source to the output shaft, if torque that decelerates the vehicle is transferred from the drive power source to the output shaft when the electric power generation performed using the rotary electric machine is restricted; and
    shift control means for controlling the transmission to change gears, when the torque that does not decelerate the vehicle is transferred from the drive power source to the output shaft.

* * * * *